United States Patent
Wloka

(10) Patent No.: US 10,685,152 B2
(45) Date of Patent: *Jun. 16, 2020

(54) SYSTEMS AND METHODS FOR FAST SIMULATION AND VISUALIZATION OF SPARSE FLUIDS

(71) Applicant: TAKE-TWO INTERACTIVE SOFTWARE, INC., New York, NY (US)

(72) Inventor: Matthias Michael Wloka, San Jose, CA (US)

(73) Assignee: TAKE-TWO INTERACTIVE SOFTWARE, INC., New York, NY (US)

(*) Notice: Subject to any disclaimer, the term of this patent is extended or adjusted under 35 U.S.C. 154(b) by 318 days.

This patent is subject to a terminal disclaimer.

(21) Appl. No.: 15/884,009

(22) Filed: Jan. 30, 2018

(65) Prior Publication Data

US 2018/0225397 A1 Aug. 9, 2018

Related U.S. Application Data

(63) Continuation of application No. 11/944,593, filed on Nov. 23, 2007, now Pat. No. 9,922,141.

(Continued)

(51) Int. Cl.
*G06T 13/60* (2011.01)
*G06T 15/04* (2011.01)
(Continued)

(52) U.S. Cl.
CPC .............. *G06F 30/20* (2020.01); *G06T 13/60* (2013.01); *G06T 15/04* (2013.01);
(Continued)

(58) Field of Classification Search
CPC ...... G06F 30/20; G06F 2111/10; G06T 13/60; G06T 15/04; G06T 17/20; G06T 2210/24
(Continued)

(56) References Cited

U.S. PATENT DOCUMENTS 5,537,641 A * 7/1996 da Vitoria Lobo ..... G06T 13/60
345/419
6,301,192 B1 * 10/2001 Reise ....................... G06T 17/20
367/11

(Continued)

OTHER PUBLICATIONS

Wang et al, "Water Drops on Surfaces", Georgia Institute of Technology, 9 pages (Year: 2005).*

(Continued)

*Primary Examiner* — Kamini S Shah
*Assistant Examiner* — Faraj Ayoub
(74) *Attorney, Agent, or Firm* — Orrick, Herrington & Sutcliffe LLP

(57) ABSTRACT

Example embodiments of the present invention are directed to systems and methods for simulating sparse fluids and visualizing the results. An example embodiment involves simulating sparse fluids on a two-dimensional surface and using that simulation to visualize the results on a three dimensional surface. The fluid computation operates in a two-dimensional (2D) plane although the visualization of the fluid simulation is three-dimensional (3D). The simulation uses surface shape and properties, local gravity vectors, and various other criteria to simulate realistic behavior of sparse fluids, e.g., sweat, tears, blood, and drops of liquid. The systems and methods of the present invention may be implemented, for example, on a highly parallel architecture, such as a graphics processing unit (GPU), and on non-parallel architectures.

17 Claims, 5 Drawing Sheets

Related U.S. Application Data

(60) Provisional application No. 60/867,054, filed on Nov. 22, 2006.

(51) Int. Cl.
  *G06F 30/20* (2020.01)
  *G06T 17/20* (2006.01)
  *G06F 111/10* (2020.01)

(52) U.S. Cl.
  CPC ........... *G06F 2111/10* (2020.01); *G06T 17/20* (2013.01); *G06T 2210/24* (2013.01)

(58) Field of Classification Search
  USPC .............................................................. 703/9
  See application file for complete search history.

(56) References Cited

U.S. PATENT DOCUMENTS

| | | |
|---|---|---|
| 6,765,584 B1 | 7/2004 | Wloka et al. |
| 2003/0117528 A1 | 6/2003 | Liang et al. |
| 2004/0181382 A1 | 9/2004 | Hu et al. |
| 2005/0234695 A1 | 10/2005 | Wang et al. |
| 2005/0256686 A1 | 11/2005 | Stabelfeldt et al. |
| 2006/0074610 A1* | 4/2006 | Rasmussen ............ G06F 30/23 703/2 |
| 2006/0139361 A1 | 6/2006 | Busch et al. |
| 2007/0038421 A1 | 2/2007 | Hu et al. |
| 2007/0043544 A1 | 2/2007 | Song et al. |
| 2008/0120075 A1 | 5/2008 | Wloka |

OTHER PUBLICATIONS

WO, ISR & WO, International Application No. PCT/US07/85476, dated Jun. 12, 2008.
gatech.edu, "Index of /~turk/my_paper", http://www.cc.gatech.edu/~turk/my_papers/, showing Water Drops on Surface (droplet.pdf) (3 pages) made public May 2005.
Miklos, "Real-Time Fluid Simulation Using Height Fields", Computer Graphics Lab ETH, (42 pages) Summer 2004, Zurich.
Wang et al., "Water Drops on Surfaces", Georgia Institute of Technology, http://www.cc.gatech.edu/~turk/my_papers/droplet.pdf, (9 pages), May 2005.

* cited by examiner

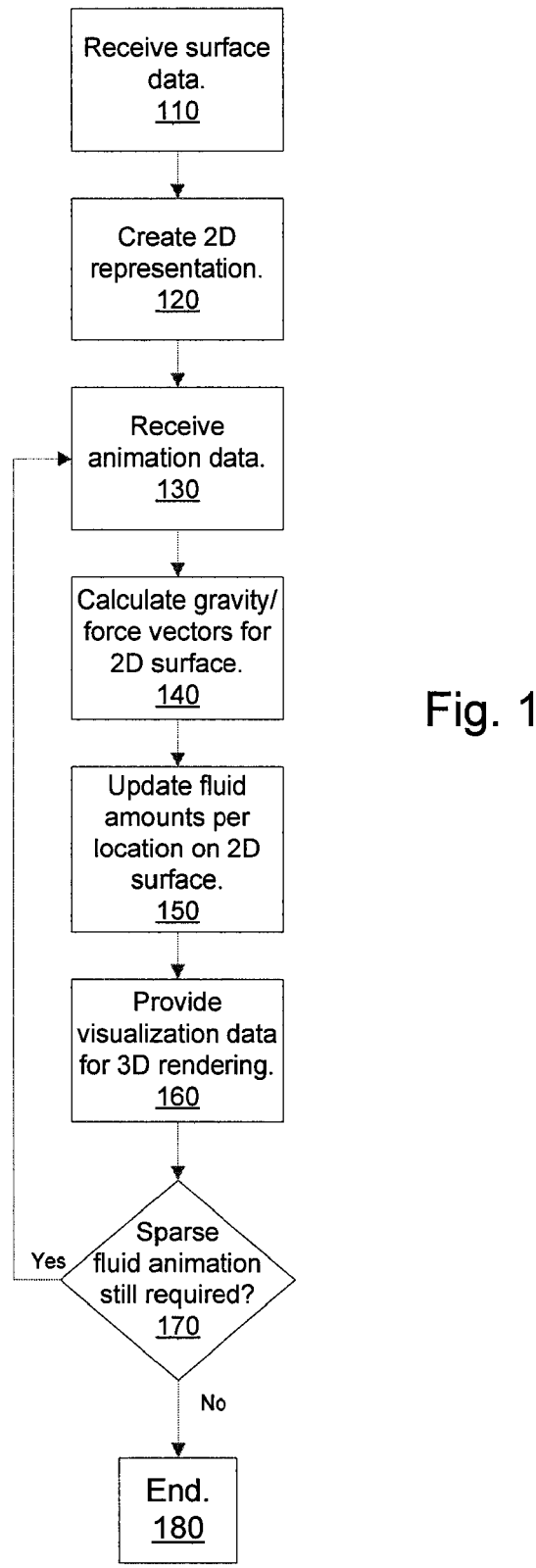

SYSTEMS AND METHODS FOR FAST SIMULATION AND VISUALIZATION OF SPARSE FLUIDS

CROSS-REFERENCE TO RELATED APPLICATION

This application is a continuation of and claims priority to U.S. patent application Ser. No. 11/944,593, filed on Nov. 23, 2007, which claimed the benefit of Provisional Patent Application No. 60/867,054, filed Nov. 22, 2006, the entire contents of which are incorporated by reference herein in their entirety and for all purposes.

FIELD OF THE INVENTION

The present disclosure relates generally to simulation and visualization of sparse fluids in three-dimensional computer graphics and, more particularly, to systems and methods that facilitate fast simulation and visualization of sparse fluids in three-dimensional computer graphics.

BACKGROUND

Manufacturers of video games, especially video games that emulate professional sporting events, attempt to inject as much realism as possible into the game. An example of this is to have a game competitor, such as a basketball player, break out into a sweat as a match progresses. Conventional techniques used to show sweat on a player such as normal map animation, consume a great deal of storage space and processing power. Moreover, normal map animation would require a series of normal maps at high resolution, e.g., 30-60 frames of 512×512 resolution. To speed up processing, animation repeats would be required with only one animation being stored, i.e., players would have to share the animation.

Thus, there is a need for systems and methods that facilitate fast simulation and visualization of sparse fluids such as sweat on character models in a real time environment.

BRIEF DESCRIPTION OF THE DRAWINGS

FIG. 1 shows a flowchart illustrating an example embodiment according to the present invention.

DETAILED DESCRIPTION

Figure 2A:
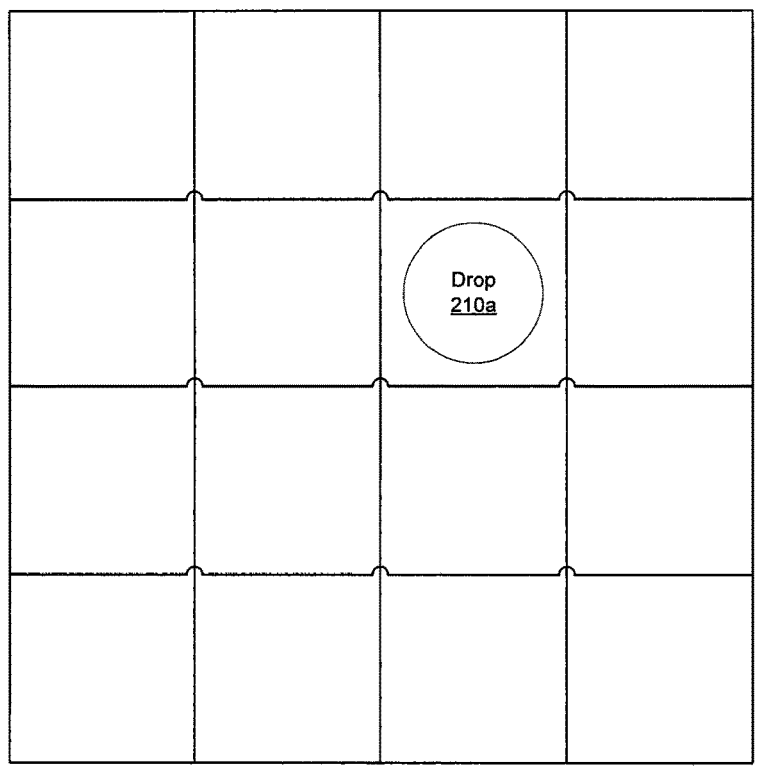
FIG. 2A shows an example graph according to the present invention.

Example embodiments of the present invention involve methods and systems to simulate sparse fluids and visualize the results. An example embodiment provides for simulating sparse fluids on a two dimensional surface and using that simulation to visualize the results on a three dimensional surface. In that way, the fluid computation operates in a two-dimensional (2D) plane although the visualization of the fluid simulation is three-dimensional (3D), e.g., the fluid flows over fully 3D surfaces such as the faces of basketball players and the fluid contains 3D fluid droplets.

Example embodiments of the present invention provide for mapping the 3D world space to the 2D plane of the fluid simulation. In an example embodiment, the shape of the surface that the fluid runs on and the surface properties (e.g., hairiness) that affect fluid flow are taken into consideration. Example embodiments of the present invention may be efficiently implemented on a highly parallel architecture, e.g., a graphics processing unit ("GPU"), or on other systems (including serial architectures).

FIG. 1 is an example procedure of how an example embodiment of the present invention may work. At 110, the example procedure may receive surface data. This surface data may be stored in memory accessible to the procedure or it may be sent to the procedure by some other procedure. At some point 110 the present procedure receives, loads, or otherwise acquires surface data for the surface that will require simulation of sparse fluids (e.g., sweat on the head of a person). Surface data could include any number of things, e.g., overall shape of the surface, size of the surface, shape of each part of the surface (e.g., one spot may have a bump and one spot may have a depression), or other surface properties (e.g., a region of the surface may have facial hair).

At 120, a two-dimensional (2D) surface is created to represent the surface of a three-dimensional (3D) object. The 2D surface may or may not ever be seen, but may be best conceptualized as a 2D surface. The 2D surface may be partitioned into a grid of equally sized areas. Each partition may represent a code object or other data structure which contains certain attribute values (e.g., a force vector or surface properties), and is organized in a 2D matrix or otherwise maintains information about what partitions are logically adjacent to any particular partition. Part of the surface data received in 110 may contain an initial fluid amount for each partition, the initial fluid amount may come from some other location, or the initial fluid amounts may be set to zero. Once the 2D surface has all of the constant surface property data (e.g., shape, grid size, or properties for each partition), and all the initial settings for the temporary surface property data (e.g., a force vector or fluid amount per partition), then the simulation may begin.

At 130, the procedure will receive animation data. The example procedure is only responsible for simulating sparse fluids on an object, but that same object may be doing several other things, each of which may affect the surface data that the sparse fluid simulator needs to know about. In the example of a basketball player having sweat, the animation data may include a position vector. At 130, the sparse fluid simulator receives the new position vector and may use it at 140 to calculate an updated gravity vector for each partition. For example, if the player was standing and looking forward the gravity vector for the nose of the player might be approximately perpendicular to the direction the player was facing, but later if the player looks down the gravity vector for the surface partition associated with the tip of the nose may now be approximately parallel to the direction the player is facing. Many factors already mentioned may affect the simulation of the fluid flow, but the temporary factors, such as local gravity vectors, may need to be updated as they change. The updates do not necessarily have to be made as often as they occur. For example, if the player is rendered sixty times a second, the sparse fluid simulator may only need to be updated thirty or fifteen times a second, or any other rate to balance the competing needs of lowering processor utilization while maintaining realistic animations. It will be appreciated that this is only one example method, and other variations are possible. For example, at 140 the local gravity vector is computed and stored in each texel. This assumes the gravity vector is the only relevant force, but other forces may be computed as well. For example, the object with sparse fluid may be in a windy area. In this example, at 140, both a gravity vector and wind force vector may be computed and combined into one overall force vector for the individual partition. Any number of force vectors may be computed and combined into the one force vector for each partition.

At 150, the fluid amounts per partition may be updated. The updating may include any number of things, but generally break down into operations which add fluid to a partition and operations which subtract fluid from a partition. Examples of operations which subtract fluid may include liftoff, roll-off, and evaporation. These concepts are described further herein. Generally, roll-off is when fluid travels to an adjacent partition, liftoff is when fluid travels off the surface (e.g., the gravity vector is approximately perpendicular to the surface indicating a drop may fall from the surface entirely), and evaporation is a small reduction in fluid amounts over time. Examples of operations which add fluid may include roll-in, lift-in, and production. These concepts are described further herein. Generally, roll-in is the converse to roll-off where the roll-in partition is receiving fluid from a neighboring roll-off partition. Additionally, each partition, depending on where it is located, has a fluid production rate. In an example of simulating tears on a face, each partition may have a production rate of zero, except for the partitions in the inner corner of the eye which may have a positive production rate. In an example of sweat on an athlete, the partitions in the forehead region may have the highest production rate and other areas different production rates, which may be designed to emulate a human sweat gland. Further, the tear example and sweat example could be combined to simulate a person both crying and sweating. In an example of a windshield in the rain, each partition may have a production rate of zero, and certain partitions may experience lift-in. In situations such as a rain or other such moving fluid situations, a surface partition may have fluid added to it via lift-in, e.g., fluid additions not coming from the surface itself (e.g., production) nor from partition neighbors (e.g., roll-in).

At 160, the procedure provides the updated visualization data for the 3D rendering. As described herein, the example procedure does not need to execute as often as the rendering procedure. At 170, the procedure may continue to loop back to 130 while the sparse fluid simulation is still needed. Other variations are possible here depending on how the example methods are implemented. For example, there may be an operation between 150 and 160 to determine if the object associated with the 2D simulation is on screen. If the object is not on screen the method may continue to perform, in order to keep track of where fluid should be located as time elapses, but may skip step 160 since the rendering does not need to know the information. Alternatively, the procedure may send the information each time but the process to which the information is sent may ignore the visualization data for objects not currently on screen. When the process is no longer needed (e.g., the game is over or the object will never return to the game), the process ends at 180.

FIGS. 2A, 2B, 2C, and 2D, illustrate example embodiments. FIG. 2A shows sixteen partitions in a four by four two-dimensional surface. This may be a section of a larger two-dimensional surface, or may be the whole two-dimensional surface. In an embodiment, this image may be an illustration of a concept that is never actually visualized. For example, each of the partitions may be associated with an area of a three-dimensional surface which may be visualized, and each partition may contain data which may be important to rendering the surface, but that data does not need to be visualized itself as a 2-dimensional surface, as is illustrated in FIGS. 2A, 2B, 2C, and 2D. In an embodiment, the grids of FIGS. 2A, 2B, 2C, and 2D represent a two-dimensional matrix of data structures, or any other data arrangement. For example, instead of a matrix, the two-dimensional surface may be a cluster of objects each with a number of pointers (e.g., four or eight) which point to the other partition objects adjacent to the partition object. Regardless of how the data and partition relations are stored and organized, the procedure may be conceptualized as a two-dimensional surface, shown in FIGS. 2A, 2B, 2C, and 2D. Though any number of data organizations are possible, one may choose the organization which maximizes parallel computation (e.g., on a GPU). In FIG. 2A, an amount of fluid is represented as a circle 210a in one of the partitions. A fluid level may be some numerical value stored in the data structure associated with that partition. When a fluid amount is above a certain threshold it may be visualized as a drop in the three-dimensional animation, and when it is below a certain threshold it may be visualized as a thin film of fluid in the three-dimensional animation. In an embodiment, how the fluid is visualized is dependent not only on fluid content of a partition, but also on fluid content of neighboring partitions.

Figure 2B:
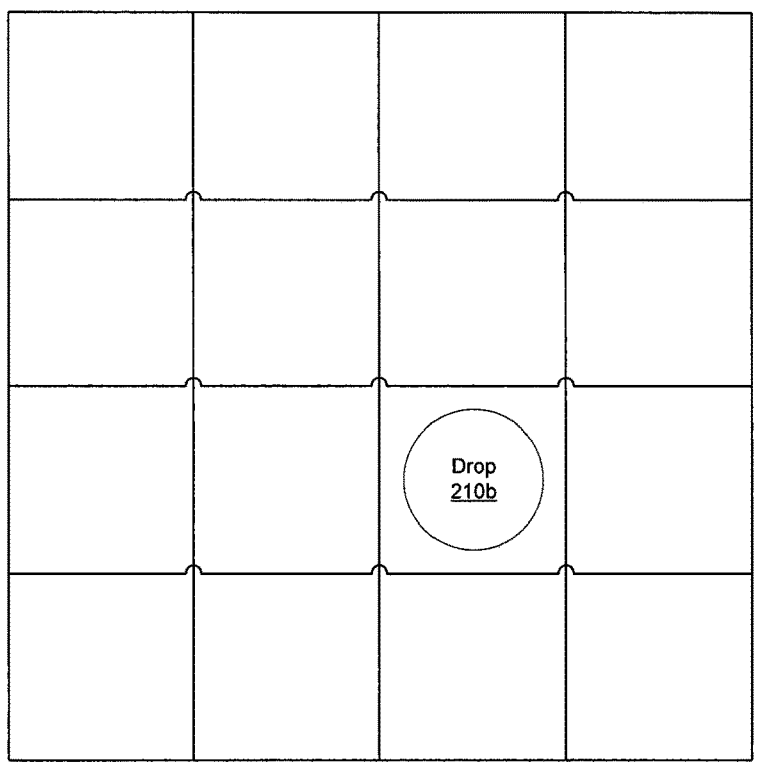
FIG. 2B shows an example graph according to the present invention.
Figure 2C:
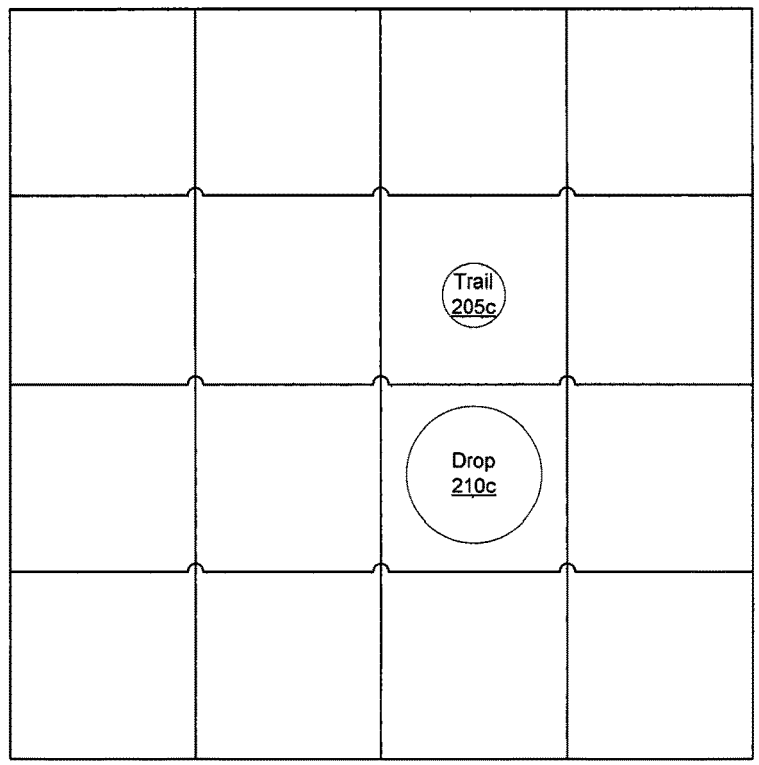
FIG. 2C shows an example graph according to the present invention.
Figure 2D:
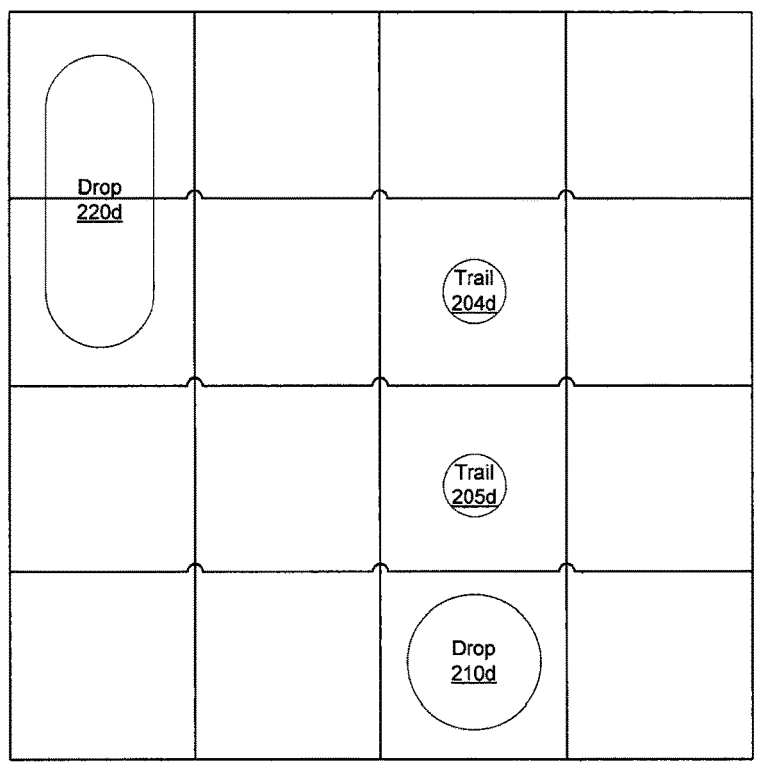
FIG. 2D shows an example graph according to the present invention.

At some point in the procedure fluid locations are updated, e.g., reference 150 of FIG. 1. FIG. 2B shows that the fluid amount 210b has moved to an adjacent partition. This could be for any number of reasons already mentioned, e.g., the local gravity vector may have pointed toward the partition fluid amount 210b is located in. Alternatively, a complete fluid amount move might not occur. FIG. 2C illustrates the same move made by FIGS. 2A, 2B, 2C, and 2D, however in this example, the fluid content represented by 210c may be slightly less and a fluid content 205c may be left behind. This example could be used to create a fluid trail. FIG. 2D at 204d, 205d, and 210d illustrates a longer fluid trail and an additional move. The image created in the 3-dimensional rendering may not be two small drops (204d and 205d) and a large drop (210d), but the 2-dimensional simulation may provide the rendering procedure with visualization data about neighboring partitions. For example, if all of the partitions around 204d were empty, then the animation may render that partition as a small drop or a small film in that area. However, if the data indicates that there is a small content in one, two or more adjacent partitions, the animation may render that as a trail connected to the partition with the higher fluid content (e.g., the moving drop). Similarly, FIG. 2D illustrates two adjacent partitions with a high content of fluid, 220d. The animation may render that not as two drops but as an oblong drop. The path a moving drop takes may not solely depend on the gravity vector, but on other surface properties as well, e.g., shape or hairiness. A drop might slow or scatter in hairy areas. A drop might go around a bump, e.g., a mole on a player or character. A drop might linger or change paths after encountering a depression, e.g., a dimple on a human face.

Figure 3:
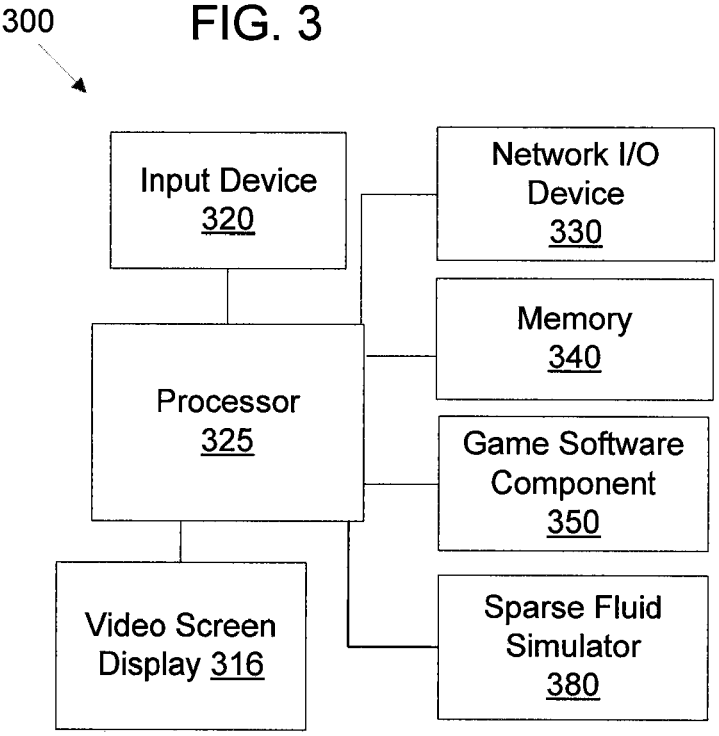
FIG. 3 shows a block diagram illustrating an example embodiment according to the present invention.

FIG. 3 illustrates an example system according to an example embodiment of the present invention. This example system may execute or run the example procedure(s) and embodiments described herein. Example system 300 has a processor 235, which may be in communication with various peripherals, e.g., input device 320 or network I/O device 330. The system 300 may be, for example, a PC and the input device 320 may be, for example, a keyboard and/or mouse. For example, the system 300 may be a game console and the input device 320 may be a game controller. The system 300 may have or be in communication with a video display 316. The system 300 may interface with the video display 316 through a graphics card. The video display 316 may be built into the system such as in a mobile game system or a cellular phone. The video display 316 may alternatively be connected to the system via a wire or wirelessly such as a PC or television based gaming console. System 300 may have a memory 340, which may be RAM, a disk-drive, a CD or DVD, ROM, flash drive, any other type of memory, or any combination of types of memory known in the art. The system 300 may have a game software component 350. The game software component may be stored in memory 340. As part of the game software component 340 or separately the system may have a sparse fluid simulator 380. The system may also have a Graphics Processing Unit. Processor 325 may be a GPU, the GPU may be in addition to processor 235, or the GPU may be located on the graphics card which may be in communication with processor 325.

Figure 4:
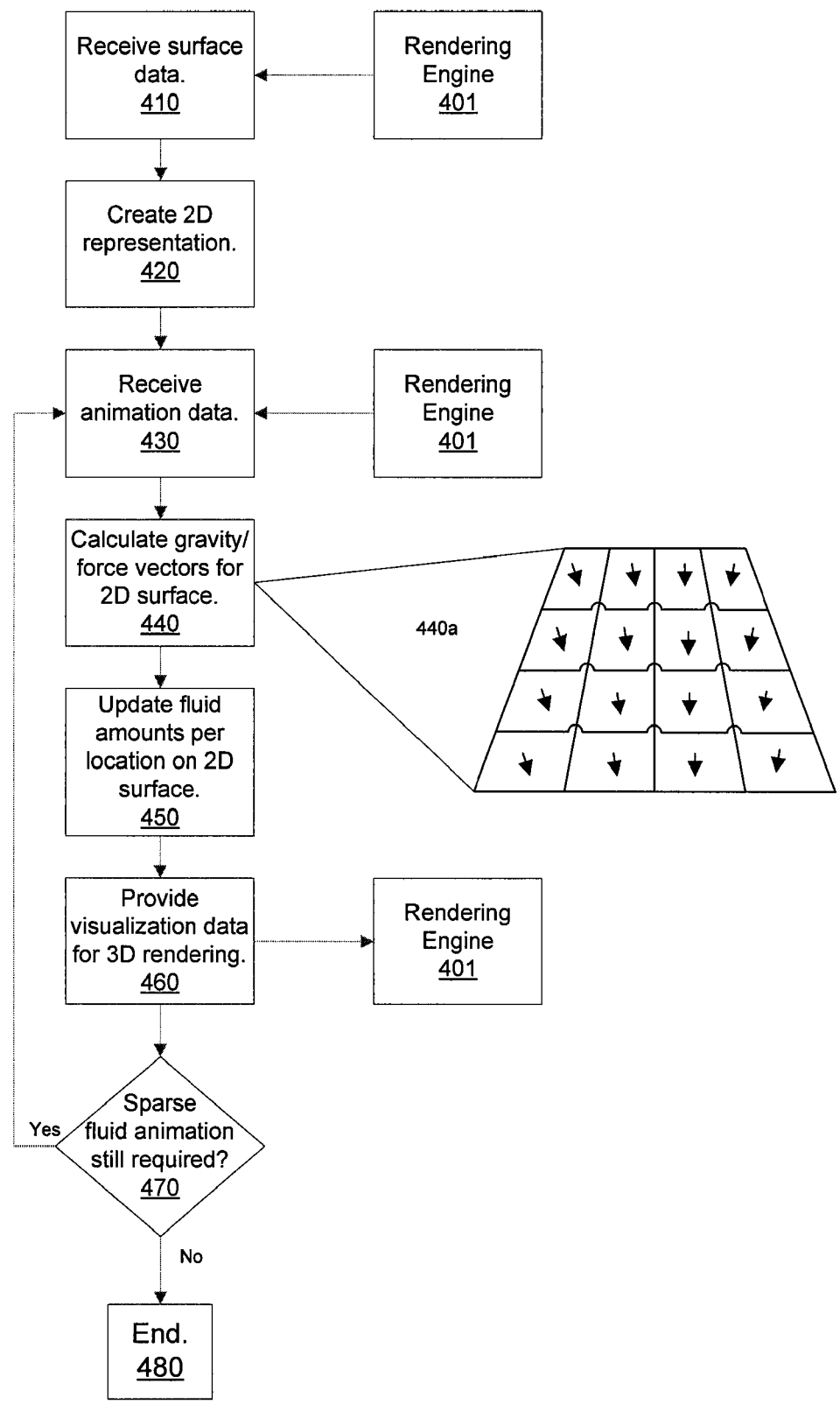
FIG. 4 shows a flowchart illustrating another example embodiment according to the present invention.

FIG. 4 is an example procedure according to an example embodiment of the present invention. FIG. 4 includes some features similar to that of FIG. 1, and further includes additional and/or alternative features. At 410, the example procedure receives surface data. In this example, the rendering engine 401 provides that data. It may be the case that the procedure described by steps 410 to 480 is performed on a parallel architecture (e.g., a GPU), and the rendering engine 401 is performed on the main processor (e.g., a CPU). At 420, the procedure will then create the 2D representation based on the surface data received at 410. At 430, the procedure may again receive data from the rendering engine 401. At this step the procedure may receive dynamic information about the object it is modeling (see, e.g., reference 130 of FIG. 1). At 440, the procedure stores a local force vector for each partition. This force vector may be the only vector, or it may be a calculation of an overall vector which was derived from many individual force vectors (e.g., wind and gravity). Illustration 440a is an example illustration of how individual force vectors may look on a 2D representation. Again however, this 2D representation may never be visualized, but may be stored as a set of numerical values (as discussed herein). At 450, the fluid levels per partition are updated (see FIGS. 2A, 2B, 2C, and 2D, for an example illustration). At 460, the rendering engine 401 is sent the relevant data to render the simulation in the 3D world. At 470, the process repeats as needed and then ends at 480. The process at 470 may also be in communication with the rendering engine to know when the simulation is no longer needed, or may get that information from another source.

Another example embodiment of the present invention may be implemented in a 3D digital graphics context. In this example, the fluid simulation operates on a fluid texture. Other than constant storage for various surface properties, this fluid texture is the only storage that the simulation requires. The texture stores the result of the fluid simulation, i.e., each partition of the texture is called a texture element ("texel") and stores a representation of an amount of fluid present. The texel may also store all local surface properties for that texel, e.g., each texel stores a local gravity vector that may determine fluid flow direction.

The size of the fluid texture may directly determine memory requirements. In an embodiment, minimizing the size is useful, since each player may require an individual fluid texture and there may be several players in the viewable display, e.g., in a basketball video game there are 20 players on the court. A minimal texture resolution also results in lower processing requirements since fewer texels need updating during each simulation step.

It may be the case that the minimum resolution ideal for depicting individual droplets is to have one texel represent one droplet, e.g., an area the size of a sweat drop maps to a single texel. In this example, the format of the fluid texture may be of the A8R8G8B8 format, which stores four eight-bit values (called "channels") named alpha, red, green, and blue. The texture format may be arbitrary. Eight bit channels is only one example. In fact, in some situations, an eight bit per component precision may require care so as to not over/underflow, in order to store a combined force vector. Depending upon the needs/requirements of the simulation, a 16-bit float per component, a 32-bit float per component, or any other data format is usable here. The alpha channel may store the amount of fluid, and the red, green, and blue channels may store a normalized gravity vector. Although the gravity vector is in tangent space and is normal, storing only two components and deriving the third may be insufficient, since the gravity vector may point towards and away from the surface (e.g., the top of the head and under the chin). Compressing the gravity vector to two components and a sign bit to gain more bits of resolution for the fluid amount may be possible. Compression may be avoided as it might complicate rendering to and reading from the fluid texture.

Since some modern GPUs disallow rendering into a texture while reading from it, fluid textures may be double-buffered. To avoid doubling memory requirements, however, it may be preferable that only one additional fluid texture is allocated and all other fluid textures may then share that one additional fluid texture. Additionally, rendering may only occur to this additional fluid texture render target. Upon completion of the rendering its contents may then be copied to the intended fluid texture. This fluid texture render target therefore needs not retain any data, and can thus be part of a reusable render target pool. In fact, on architectures with dedicated on-chip VRAM for rendering, the fluid texture render target may live on the on-chip VRAM, e.g., it may consume no main memory.

The first step of the 2D simulation may be to generate a normalized tangent space vector for every texel (e.g. partition) of the fluid texture. Later on, these gravity vectors may determine in part the fluid flow direction for each texel. Although gravity in world space is constant in space and time, e.g., (0, −1, 0), mapping this vector into local tangent space may result in spatial variation, which may require one gravity vector per texel, and may be dynamic as objects (e.g., players) move and animate.

When rendering the object, a separate rendering pass, called a gravity pass, may be responsible for writing updated gravity vectors to the fluid texture. The gravity pass may receive as input the object mesh (a mesh is a collection of connected vertices that may define the shape of a 3D object). It may then use the uv-coordinates of the mesh as the output positions of the vertex, thus unwrapping the mesh onto the fluid texture render target (see Example Code Segment 1 below). The uv-coordinates of a mesh may be created by a process called uv-mapping where the coordinates X, Y, and Z of 3D space may be mapped onto a 2D UV coordinate plane.

The gravity pass may then transform the constant world space gravity vector (0, −1, 0) into tangent space using the tangent space of the mesh as represented by the incoming normal, tangent, and binormal vectors (see also Example Code Segment 1 below). The vertex shader may then forward this tangent space gravity vector to the pixel shader.

In an embodiment of the present invention, when the gravity pass pixel shader receives the gravity vector, it may write this value directly to the R, G and B channels of the fluid texture. To achieve a higher fidelity result, however, it may also account for per-pixel normals. Thus, surface wrinkles that only exist in the normal map of a surface—and not just the geometry of the surface—may influence the flow of fluid. To achieve this result, the pixel shader compares the tangent space vertex normal to the tangent space per-pixel normal. The shader then constructs a rotation matrix that rotates the per-pixel normal onto the vertex normal, and then may apply this same transformation to the incoming gravity vector. In this example, one assumes the only relevant force vector is the gravity vector. In further embodiments, any number of other force vectors could be computed in one pass (e.g., the gravity pass) or in a series of passes. The plurality of force vectors may then be combined into one overall force vector for each texel, and that overall force vector may be what is finally stored in the R, G, and B channels of the fluid texture. Note, in this example, a full three components are to be stored, in contrast to the earlier-described situation of storing just a gravity vector. A force vector which accounts for more forces than just gravity may not be normal, and may thus require the storing of all three components (e.g., not just two components and a sign bit). In situations where more force data needs to be stored, the simulation may require and/or perform better with data formats having more than eight bits per channel.

In further embodiments, the gravity pass pixel shader copies the existing fluid amount from the previous fluid texture. Copying the fluid amount may be necessary because the next step may blit the just computed gravity vectors onto the fluid texture. Blitting, which is an operation in which two bitmap patterns are combined into one using a raster operator, may overwrite all channels of a texture. A gloss map that describes how specular an area of skin is modulates this copy operation. In areas of low gloss, e.g., areas of facial hair or other areas where one may not expect to find fluid, the amount of fluid present may be reduced. The existing gloss map for a player, which is also used during the skin rendering of a player, may be used.

Thus, in an embodiment of the present invention, a new fluid texture that contains up-to-date gravity vectors is obtainable. The new texture may be blitted to the previous fluid texture, thus updating it. Below are two example code methods for performing the above described procedures.

```
GRAVITY_VERTEX_OUTPUT GravityVertexShader( GRAVITY VERTEX INPUT In )
{
GRAVITY_VERTEX_OUTPUT Out;
Out.Tex = In.Tex;
// texcoords are [0,1], but clip space pos is [−1,1]
float2 pos = 2 * Out.Tex − 1;
Out.Pos = float4(pos.x, −pos.y, 0.5, 1);
// Transform gravity world space normal to tex-space:
// float3x3(Out.Tangent, Out.Binormal, Out.Normal) transforms
// from tangent to world inverting that matrix therefore
// transforms from world to tangent space. This matrix
// is just a rotation matrix, i.e., its inverse is the same as
// its transpose
float3 WorldNormal = mul( In.Normal, ObjectToWorldMatrix )
float3 WorldTangent = mul( In.Tangent, ObjectToWorldMatrix );
float3 WorldBinormal = mul( In.Binormal, ObjectToWorldMatrix );
float3x3 WorldToTangentMatrix = transpose( float3x3(WorldTangent,
WorldBinormal,
WorldNormal));
float3 kGravity = float3(0, −1, 0); // world space gravity vector
// transform to tangent space and encode into [0,1] range
Out. Gravity = 0.5*mul(kGravity, WorldToTangentMatrix) + 0.5;
return Out;
}
```

Example Code Segment 1: The Vertex Shader of the Gravity Pass to Generate Tangent Space Gravity Vectors.

```
float4 GravityPixelShader (GRAVITY_PIXEL_INPUT In) : COLOR
{
// All vectors (and all computations) are in tangent space!
float3 VertexGravity = 2*In.Gravity − 1;
float3 PixelNormal = tex2D ( NormalMap In.Tex.xy );
float3 VertexNormal = float3(0, 0, 1);    // by definition
// Construct a rotation matrix from rotAxis, rotAngle:
// Note: because of VertexNormal = (0, 0, 1) the actual
// computations are *much* simpler, ie z = 0 etc.
// Optimizations are left to the compiler...
// Note also that if PixelNormal == VertexNormal rotMatrix
// comes out to be Identity since 0*garbage = 0;
float3 rotAxis = normalize(cross( VertexNormal, PixelNormal));
float rotAngle = acos(     dot( VertexNormal, PixelNormal));
float  s, c;
sincos(rotAngle, s, c);
float t = 1 − c;
float x = rotAxis.x;
float y = rotAxis.y;
float z = rotAxis.z;
float3x3 rotMatrix;
rotMatrix._11 = t*x*x + c;
rotMatrix._21 = t*x*y − z*s;
rotMatrix._31 = t*x*z + y*s;
rotMatrix_12 = t*y*x + z*s;
rotMatrix_22 = t*y*y + c;
rotMatrix._32 = t*y*z − x*s;
rotMatrix._13 = t*z*x − y*s;
rotMatrix._23 = t*z*y + x*s;
rotMatrix._33 = t*z*z + c;
float3 PixelGravity = mul(VertexGravity, rotMatrix);
// copy the sweat amount from alpha to alpha, but use the
// specular map to mask out drops in areas w/ low specularity,
// e.g. hair
// Specular values of 0.2 and higher leave the alpha unchanged;
// specular values from 0 to 0.2 reduce the alpha value.
float SpecularMask = min(1.0, 5.0 * tex2D( GlossMap, In.Tex ).a);
float Amount = tex2D(FluidMap, In.Tex).a * SpecularMask;
return float4(0.5*PixelGravity + 0.5, Amount);
}
```

Example Code Segment 2: The Pixel Shader of the Gravity Pass to Generate Tangent Space Gravity Vectors.

In an embodiment, the second step of the 2D simulation may be to update the amount of fluid in each texel; the fluid simulation may render a full screen quad that is textured with the fluid texture to the fluid texture render target. For each texel, the procedure may read the gravity vector of that texel and current amount of fluid. The new amount of fluid is the old amount minus fluid lost and plus any incoming fluid.

As described herein via other example embodiments, three processes may account for fluid loss: liftoff, roll-off, and evaporation. Liftoff may describe a drop of fluid falling off the surface. Liftoff occurs when there is a sufficient mass of fluid contained in a texel and the local force vector points substantially away from the surface. In tangent space, the vector (0, 0, 1) points straight away from the surface, so the dot product of that vector with the tangent space gravity vector is simply the z component of the gravity vector, example:

LiftForce=selfMass*selfGravity
   dot(0,0,1)=selfMass*selfGravity.z

If this perpendicular lift force exceeds a threshold, all the fluid in the texel may vanish from our simulation. Leaving a small residual amount of fluid behind after a liftoff event is conceivable, but may not add any noticeable visual complexity.

A drop of fluid rolling into a neighboring texel may represent fluid loss through roll-off. The gravity vector is projected onto the tangent plane and its product with the mass of the fluid stored in its corresponding texel is evaluated, for example:

RollForce=selfMass*length(selfGravity.xy)

if the roll force exceeds a threshold, a certain amount of fluid may be subtracted from the current value. Leaving a residual amount of fluid in a texel that experiences a roll-off event is useful, for example, to model trailing streaks for drops that roll along a surface.

The final fluid losing process is evaporation. Every texel may experience a constant loss of fluid due to evaporation if neither liftoff or roll-off occur. Areas of low gloss may experience additional evaporation. Additional evaporation may be modeled by dampening the fluid amounts while copying them during gravity vector computations.

Incoming fluid may originate from several possible sources: direct production, lift-in, spontaneous generation of fluid (e.g., rain hitting a windshield), and roll-in from a neighbor. Direct production may account for newly produced fluid. Each texel has a production rate. For a sweat simulation, the high production zones may be designed to model the layout of a typical sweat gland. A programmatically controlled value that models 'sweatiness' may modulate this production amount, thus dynamically increasing or decreasing sweat production as appropriate. For a tear simulation, the high production zones may be coded to be the texels located in the inner corner of the eyes. The program may then modulate the production, dynamically increasing or decreasing tear production as appropriate.

Roll-in from a neighbor may collect fluid that rolls from any of the eight neighboring texels onto the texel under consideration. To compute roll-in, liftoff and roll-off may be computed for all eight neighbors. When a neighbor experiences roll-off, but not liftoff, its roll-off direction may be used to identify which adjacent texels should receive what quantity of fluid, and the appropriate additions may be made. Additionally, when fluid enters a partition, but was not generated (e.g., production) and did not come from neighboring partitions (e.g., roll-in), it may be from lift-in. Similar but converse to liftoff, lift-in may occur when an amount of fluid enters the surface from space not part of the surface, (e.g., a falling rain drop landing on the surface).

The simulation pixel shader (see, e.g., Example Code Segment 3) may account for all these fluid loss and incoming fluid processes. Setting the U and V addressing modes of the fluid texture to wrap may allow texels along the border to execute the identical pixel shader. Because the simulation may be of low spatial resolution, e.g., a single texel represents a drop, it may be beneficial to also limit temporal resolution. In an embodiment, to maximize the simplification of the pixel shader when implicitly encoding a time-step in it, a time-step of one is chosen. Also, for example, running the simulation at a less frequent rate as the 3D rendering may be useful. For example, running the simulation at around 15 Hz, e.g., every fourth frame of a 60 Hz presentation, may yield visually acceptable results.

```
// Fluid Simulation Pixel shader -- it takes as input:
// - current distribution of fluid, in this case sweat (given as 'sweat
mass' per texel)
// - a gravity acceleration vector per texel
// It computes a new sweat mass per pixel, based on:
// Mass Losses:
// - a sweat mass might fall off the surface
// - a sweat mass might roll into neighboring texels
// - sweat may evaporate a little
// Mass Gains:
// - a sweat mass might roll in from any of its 8 neighbors
// - new sweat may be produced at this pixel
// First a number of helper functions.
float3 FetchGravityVector(float2 uv)
{
return 2 * tex2D( SweatMapSampler, uv).xyz - 1 );
}
float FetchMass(float2 uv)
{
// compress range to gain more bits near zero
return 0.66666667 * tex2D( SweatMapSampler, uv).a;
}
float4 EncodeGravityAndMass(float3 Gravity, float mass)
{
// range expand the value to gain accuracy near zero
return float4(0.5*Gravity + 0.5, 1.5*mass.r);
}
float4 SweatSimMaterial_PS( float2 uv : TEXCOORD0 ) {
// Get the current sweat amount for this texel/pixel
float selfMass = FetchMass(uv);
float3 selfGravity = FetchGravityVector(uv);
// amount of force acting on sweat mass to lift of texture plane
// and to roll around texture plane
float LiftForce = selfMass * selfGravity.z;
float RollForce = selfMass * length(float2(selfGravity.xy));
if (LiftForce > LiftOff)
selfMass = LiftOffResidual;
else if (RollForce > RollOff)
selfMass -= (selfMass- RollOffResidual) * length(selfGravity.xy);
else
selfMass -= Evaporation;
// Accounted for all the losses; now lets add stuff back in:
selfMass += ProductionRate * tex2D(SweatProductionMapSampler, uv).r;
// From neighbors
float2 Offset[8]   ={   {-1, -1}, {0,     -1),    {1, -1),
                        {-1, 0},                  {1, 0},
                        {-1,  1}, {0,      1},    {1, 1}};
const float kOneOverSqrt2 = 0.707106781;  //= 1/sqrt(2.0);
float2 neighborCoords;
float neighborMass;
float3 neighborGravity;
float2 RollDirection;
for (int i = 0; i < 8; i++)
{
neighborCoords = Offset[i] * Delta.xy + uv;
neighborMass = FetchMass( neighborCoords);
neighborGravity = FetchGravityVector(neighborCoords);
// Is the neighbor rolling?
RollDirection = neighborGravity.xy;
LiftForce    = neighborMass * neighborGravity.z;
RollForce    = neighborMass * length(RollDirection);
if ((LiftForce <= Liftoff) && (RollForce > RollOff)) {
// yes it is
float totalRollingMass = neighborMass *length(RollDirection);
float2 dir = -normalize (float2 (Offset [i] .x, -Offset [i] .y)) ;
// how much of it is heading our way?
// RollDirection lies between two of the direction vectors:
// is its angle between those 2 vectors is > 0 and < 45
// (because we have 8 neighbor directions). So we only need
// to consider neighbors whose dot product between gravity to
// direction vectors is <= 1 and >= cos(45) = 1/sqrt(2)
float cosAngle = dot(normalize(RollDirection), dir);
if (cosAngle > kOneOversqrt2)
{
// Now add the mass of the neighbor proportional to what the
// above angle is, ie, if cosAngle == 1, then the
```

```
// rollDirection is exactly the same as the direction, and
// we need to add all of the mass. If
// cosAngle = kOneOverSgrt2, we add none of the mass: the
// pixel next to us gets all the mass.
float ratio = (cosAngle - kOneOversgrt2)
            / (1        - kOneOverSgrt2);
selfMass += ratio * totalRollingMass;
            }
        }
    }
return EncodeGravityAndMass(selfGravity, selfMass);
}
```

Example Code Segment 3: the Simulation Pixel Shader Updates the Amount Offluid Present for Every Texel of the Fluid Texture.

A final step of the example 2D simulation is fluid visualization. It may translate the abstract fluid texture of a surface into visual properties while rendering that same surface. In the example of sweat on a human, a fluid texture may modify skin rendering. If the fluid texture indicates no fluid present, skin rendering may remain unaltered (see Example Code Segment 4). If there is fluid, a gloss term and a normal deriving from the amount of fluid may combine to create an additional specular term that may modify the existing skin rendering.

In an embodiment of the present invention, the existing UV-mapping of an object is used to map the fluid texture onto the object. In an example design, fluid texture texels are quadrilaterals the size of a drop. For example, a 32×32 pixel drop texture that may contain normals representing a half-sphere in its R, G, and B channels and an alpha cut-out of a circle in its alpha channel, may tile over the model so that each fluid texture texel shows exactly one half-sphere. While one may readily analytically compute the half-sphere normals and alpha values in the shader, using a texture look-up is useful in some embodiments since it allows use of mipmapping, and may thus result in a dramatic reduction of aliasing artifacts, and simple calculation errors. The gloss term may be defined as the amount of fluid times the alpha value of the drop texture. The normal may be the product of the gloss term times the drop texture normal, e.g., a decreasing amount of fluid may increasingly flatten the half-sphere.

In an embodiment, for fluid texture texels whose neighbors along the V-axis also contain fluid, the gloss term and normal may be further modified. If the above neighbor has any amount of fluid, the gloss term and normal change for all pixels in the upper half of a fluid texture texel. The distance between a pixel to the border of an above neighboring texel interpolates between the fluid amount of the current texel and the neighboring texel. The alpha and normal look-ups also are changed by forcing the V-coordinate of the drop-texture to 0.5. The resulting gloss term and normal thus represent a half-cylinder whose bottom cap is a half-sphere and whose top is flat (see, e.g., FIG. 2D). As discussed in other embodiments, a decreasing amount of fluid may progressively flattens the half-cylinder. Any number of additional tweaks or adjustments may be made based on the relative fluid amounts in adjacent texels. For example, if the below neighbor has more fluid than the current texel, the gloss term and normal could change for all pixels in the lower half of a fluid texture texel. As before, the distance of a texel to the border of a below neighboring texel interpolates between the fluid amounts of the current texel and the neighboring texel fluid. The alpha and normal look-up in the drop-texture may use a V-coordinate of 0.5 in that example.

The resulting gloss term and normal then represents a half-cylinder whose bottom cap is a flat and whose top depends on its upper neighbor. Another example includes making the UV-coordinates of the drop-texture inversely proportional to the gloss term prior to look up. A small gloss term, e.g., a low amount of fluid, may result in a smaller drop when none of the neighbors contain fluid or in tapered half-cylinders when they do (e.g., pear shaped), which may create a more realistic trail as the drop moves.

The function ComputeSweatNormalAndGloss( ) in Example Code Segment 4 is an example of how to compute the gloss term and normal in a pixel shader. The skin shader may use the results from that function to modify its output. It may transform the normal to world space and may use it for a cubic environment reflection map look-up. Multiplying this look-up value with the gloss term and a Fresnel term may have the final result of a sweat based specular term that replaces the regular specular term of the skin

```
float4 ComputeSweatNormalAndGloss(float2 TexCoord)
{
// Gloss is the fluid amount in the fluid texture.
float Gloss = tex2D(FluidMap, TexCoord).a;
const float2 FluidDim = float2(128, 128); //Fluid texture dimensions
float2 ScaledTexCoord = TexCoord*FluidDim;
float2 CellOffset = frac(ScaledTexCoord);
// now if the cell above me also has sweat, then force all
// texcoords < .5 to .5. That way we connect the two cells.
// Same for the cell below. None of this matters if Gloss = = 0.
if (Gloss > 0)
{
float AboveAmount = tex2D(FluidMap, (ScaledTexCoord-float2(0,1))
                                                / FluidDim).a;
float BelowAmount = tex2D(FluidMap, (ScaledTexCoord+float2(0,1))
                                                / FluidDim).a;
if ((AboveAmount > 0) && (CellOffset.y < 0.5))
{
// interpolate gloss to match above neighbor
Gloss =     (AboveAmount+Gloss)/2 +
            CellOffset.y * (Gloss - AboveAmount);
CellOffset.y = 0.5;
}
if ((BelowAmount > Gloss) && (CellOffset.y > 0.5))
{
Gloss =     (BelowAmount+Gloss)/2 +
            (1-CellOffset.y) * (Gloss - BelowAmount);
CellOffset.y = 0.5;
}
// Change apparent size of the drop based on the Gloss amount.
// We do that by scaling the CellOffset coordinates
CellOffset = (1/sqrt(Gloss)) * (CellOffset - 0.5) + 0.5;
}
// While its easy (and cheaper) to compute half-sphere normals and
// alphas analytically, using a small texture (w/ mipmaps!) also
// gives free anti-aliasing (analytic solution is sparkle city!)
float4 DropTexture = tex2D( DropMap, CellOffset );
// set gloss to zero outside of the drop circle
Gloss *= DropTexture.a;
// if gloss amount is low, flatten the drop
float2 SweatNormal;
SweatNormal = 2 * DropTexture.xy - 1;
SweatNormal *= Gloss;
return float4( SweatNormal, 0, Gloss );
}
float4 SkinPixelShader( SKINSHADER PIXEL INPUT In) : COLOR
{
SKIN COMPONENTS skin = ComputeSkin( In );
float3 SweatSpecular = float3( 0, 0, 0);
float4 SweatNormalAndGloss =
ComputeSweatNormalAndGloss(In.Tex.xy);
if ( SweatNormalAndGloss.w > 0 )
{
float3x3 TangentToWorldMatrix = float3x3( In-Tangent,
                                          In.Binormal,
                                          In.Normal );
float3 SweatNormal;
```

```
SweatNormal.xy = SweatNormalAndGloss.xy;
SweatNormal.z = sqrt(1 - dot(Sweatwormal.xy, SweatNormal.xy));
SweatNormal = mul( SweatNormal, TangentToWorldMatrix );
SweatSpecular = SweatNormalAndGloss.w * TweakDropBrightess
                * ComputeFresnel(-In.Eye, SweatNormal, 1.5);
SweatSpecular *= texCUBE( SharpReflectionMap,
                reflect( In.Eye, SweatNormal));
// take off some of the regular specular for drop areas,
SweatSpecular -= TweakSpecularReduction * skin.Specular;
}
float3 Result = skin.Diffuse + skin.Specular + SweatSpecular;
return float4( Result, 1);
}
```

Example Code Segment 4: a Skin Pixel Shader Uses the ComputeSweatNormalAndGloss( ) Function to Translate Fluid Amounts into Visual Properties.

It should be understood that there exist implementations of other variations and modifications of the invention and its various features, as may be readily apparent to those of ordinary skill in the art, and that the invention is not limited by specific embodiments described herein. Features and embodiments described above may be combined in various ways. It is therefore contemplated to cover any and all modifications, variations, combinations or equivalents that fall within the scope of the basic underlying principals disclosed and claimed herein.

It will be appreciated that all of the disclosed methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, and procedures.

What is claimed is:

1. A method for computer graphics simulation of fluid flow of sparse fluids on a three dimensional surface using a processor, wherein the processor performs actions comprising:
    creating a partitioned two dimensional surface representing the three dimensional surface;
    determining a normal vector for each partition of the partitioned two dimensional surface;
    determining a gravitational force vector for each partition;
    determining an amount of fluid associated with each partition;
    determining fluid flow on the two dimensional surface, including determining changes in the amount of fluid associated with each partition based at least in part on the gravitational force vector; wherein this said determination of fluid flow includes accounting for fluid moving to and from neighboring partitions of each two dimensional partition; wherein the simulation of fluid flow of sparse fluids are performed only within partitions contained in the two-dimensional surface;
    reducing processor utilization while maintaining realistic animation based on said determined fluid flow on the two-dimensional surface; and
    visualizing the simulated fluid flow of sparse fluids over the three dimensional surface in three-dimensional computer graphics for rendering on a display screen based on said determined fluid flow on the two dimensional surface, wherein the visualizing includes translating the amount of fluid per partition to visual characteristics of a corresponding portion of the three dimensional surface.

2. The method of claim 1, wherein the visualizing includes translating the amount of fluid in each two dimensional partition to visual properties including specularity, while rendering the three dimensional surface.

3. The method of claim 1, wherein the simulating occurs less frequently than a rendering.

4. The method of claim 1, wherein the simulating occurs more frequently than a rendering.

5. The method of claim 1, wherein the simulating occurs at a same frequency as a rendering.

6. The method of claim 1, wherein the simulating further includes storing surface properties for each partition in a data structure.

7. The method of claim 1, further comprising storing at least one of the created partitioned two dimensional surface, the gravitational force vector, and the determined amount of fluid in a texture file.

8. The method of claim 1, wherein the determination of changes in the amount of fluid associated with each partition is based at least in part on any of or any combination of: a fluid evaporation rate, a fluid production rate, and surface properties of each partition.

9. The method of claim 1, wherein the simulation further includes receiving a second force vector.

10. The method of claim 9, wherein the gravitational force vector is stored in a data structure in a format that combines it with the received second force vector.

11. The method of claim 1, wherein the determination of changes in the amount of fluid associated with each partition is based in part on evaluating the gravitational force vector to determine the amount of fluid that has lifted off the partitioned two dimensional surface.

12. The method of claim 1, wherein a size of each partition of the two dimensional surface is determined at least in part by a size of a drop of the fluid.

13. The method of claim 1, wherein a shape of the fluid on any particular partition is determined at least in part by an amount of fluid in partitions adjacent to a specific partition.

14. The method of claim 1, wherein the determination of changes in the amount of fluid accounts for per-pixel normal.

15. A non-transitory non-volatile computer-program product comprising a processor-readable medium having a sequence of instructions store thereon, which, when executed by a processor, cause the performance of a method for computer graphics simulation sparse fluid flow on a three dimensional surface, the method comprising:
    creating a partitioned two dimensional surface representing the three dimensional surface;
    determining a normal vector for each partition in the data structure of the partitioned two dimensional surface;
    determining a gravitational force vector for each partition;
    determining an amount of fluid associated with each partition;
    determining fluid flow on the two dimensional surface, including determining changes in the amount of fluid associated with each partition based at least in part on the gravitational force vector;
    wherein this said determination of fluid flow includes accounting for fluid moving to and from neighboring partitions of each two dimensional partition; wherein the simulation of fluid flow of sparse fluids are performed only within partitions contained in the two-dimensional surface;

reducing processor utilization while maintaining realistic animation based on said determined fluid flow on the two-dimensional surface; and visualizing the simulated fluid flow of sparse fluids over the three dimensional surface in three-dimensional computer graphics for rendering on a display screen based on said determined fluid flow on the two dimensional surface, wherein the visualizing includes translating the amount of fluid per partition to visual characteristics of a corresponding portion of the three dimensional surface.

16. A system for computer graphics simulation of fluid flow of sparse fluids on a three dimensional surface, comprising:

a processor configured to create a partitioned two dimensional surface representing the three dimensional surface;

the processor configured to determine a normal vector for each partition of the partitioned two dimensional surface;

the processor configured determine a gravitational force vector for each partition;

the processor configured to determine an amount of fluid associated with each partition;

the processor configured to determine fluid flow on the two dimensional surface, including determining changes in the amount of fluid associated with each partition based at least in part on the gravitational force vector; wherein this said determination of fluid flow includes accounting for fluid moving to and from neighboring partitions of each two dimensional partition; wherein the simulation of fluid flow of sparse fluids are performed only within partitions contained in the two-dimensional surface;

reducing processor utilization while maintaining realistic animation based on said determined fluid flow on the two-dimensional surface; and the processor configured to visualize the simulated fluid flow of sparse fluids over the three dimensional surface in three-dimensional computer graphics for rendering on a display screen based on said determined fluid flow on the two dimensional surface, wherein the visualizing includes translating the amount of fluid amounts per partition to visual characteristics of a corresponding portion of the three dimensional surface.

17. The system of claim 16, wherein the processor is a GPU.

* * * * *